Patented Dec. 25, 1951

2,580,059

UNITED STATES PATENT OFFICE 2,580,059

2 - HYDROXY - PTEROIC ACID AND THE N - FORMYLATED DERIVATIVES THEREOF

Donald E. Wolf, Franklin Township, Union County, N. J., assignor to Merck & Co., Inc., Rahway, N. J., a corporation of New Jersey No Drawing. Original application August 10, 1946, Serial No. 689,815. Divided and this application March 22, 1947, Serial No. 736,585

10 Claims. (Cl. 260—251.5)

This invention relates to new chemical compounds. More particularly, it is concerned with desiminorhizopterin and related compounds which have biological importance and are useful in elucidating the structure of nutritional and growth factor for microorganisms.

This application is a division of the co-pending application by the same inventor, Serial No. 689,815, filed August 10, 1946, now abandoned.

The compounds forming the subject matter of the present invention can be represented by the formula

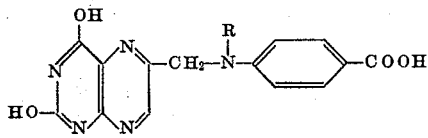

wherein R represents hydrogen and formyl substituents.

A compound of this general structure wherein R is a formyl group is fully defined by the chemical name 4-([(2,4-dihydroxy-6-pteridyl)methyl]formylamino)benzoic acid and will hereinafter be referred to as desiminorhizopterin.

A compound of the above formula wherein R is hydrogen is fully defined by the chemical name 4-([(2,4 - dihydroxy - 6 - pteridyl)methyl]amino)benzoic acid and will hereinafter be referred to as desiminoaporhizopterin.

In accordance with my invention these new compounds may be prepared by reacting nitrous acid with rhizopterin 4-([(2-amino-4-hydroxy-6 - pteridyl)methyl]formylamino)benzoic acid) to form desiminorhizopterin (4-([(2,4-dihydroxy-6 - pteridyl)methyl]formylamino)benzoic acid) and hydrolyzing the latter compound to form desiminoaporhizopterin (4 - ([(2,4 - dihydroxy-6-pteridyl)methyl]amino)benzoic acid). This reaction can be indicated graphically as follows:

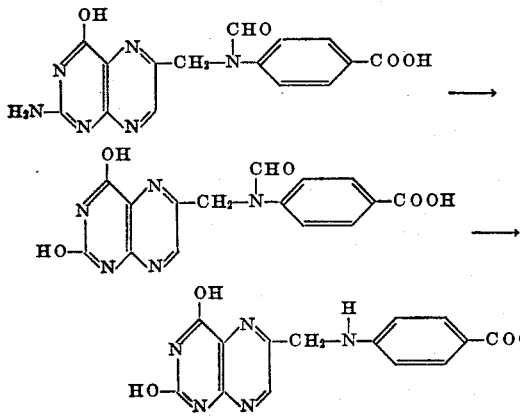

The starting material, 4-([(2 - amino - 4 - hydroxy - 6 - pteridyl)methyl]formylamino)benzoic acid, commonly referred to as rhizopterin, is the pterin-like acidic chemical compound obtained from fumaric acid fermentation liquor. This general process and rhizopterin thereby secured is disclosed and claimed in a copending application of my colleagues, Keresztesy and Rickes, Serial No. 536,434, filed May 19, 1944, now Patent No. 2,478,404.

Desiminorhizopterin is obtained in accordance with this invention by reacting an acid solution of rhizopterin with a mixture capable of evolving nitrous acid. Thus, when mixtures such as sodium nitrite and acetic acid are added to a concentrated hydrochloric acid solution of rhizopterin, nitrous acid is evolved in the reaction mixture and reacts upon the rhizopterin to form desiminorhizopterin. The reaction is preferably conducted at room temperature at which temperature the reaction is completed in about one hour. The solution is concentrated to dryness in vacuo and the residue extracted with water to remove inorganic salts. The crude reaction compound is thereby recovered as a yellow solid which can be purified by recrystallization from hot water.

Desiminoaporhizopterin can be prepared by reacting desiminorhizopterin with a concentrated acid, diluting the reaction mixture with water and recovering the yellow precipitate thus formed. The crude desiminoaporhizopterin is purified by dissolving it in ammonium hydroxide and acidifying the solution slowly with acetic acid thus causing separation of the product as a crystalline precipitate.

The following example illustrates a method of carrying out the present invention, but it is to be understood that this example is given by way of illustration and not of limitation.

Example 26 mg. of rhizopterin are dissolved in cold contrated hydrochloric acid and a mixture of sodium nitrite and acetic acid is added. The reaction is allowed to proceed for 1 hour at room temperature, after which the solution is evaporated to dryness in vacuo. The residue is extracted with cold water to remove inorganic salts, and the the insoluble desiminorhizopterin, i. e. 4-([(2,4-dihydroxy-6-pteridyl)methyl]formylamino)benzoic acid, remains as a light yellow solid. It is purified by recrystallization from hot water. The pure product melts at 319–322°.

Anal.—Calcd. for $C_{15}H_{11}N_5O_5$: C, 52.79; H, 3.25. Found: C, 52.62; H, 2.93. C, 52.78; H, 3.36.

2 mg. of desiminorhizopterin are suspended in strong hydrochloric acid (about 7 to 8 N solution), and the suspension heated in the steam bath for 5 minutes. Dilution with water causes the precipitation of a bright yellow desiminoaporhizopterin i. e., 4-([(2,4-dihydroxy-6-pteridyl)methyl]amino)benzoic acid, which is centrifuged and washed with water. The crude desiminoaporhizopterin is purified by dissolving it in dilute ammonium hydroxide and slowly acidifying the solution with acetic acid. Pure desiminoaporhizopterin is thus obtained in the form of fine yellow crystals.

Anal.—Calcd. for $C_{14}H_{11}N_5O_4$: C, 53.67; H, 3.54. Found: C, 53.83; H, 3.52.

Pure desiminoaporhizopterin is soluble in alkalies only, and is characterized by the following ultra-violet absorption spectrum:

|       | Wave lengths in Å. | E% |
|-------|--------------------|------|
| pH: 11 | 2385 | 492 |
|       | 2780 | 920 |
|       | 3550 | 220 |
| pH: 7 | 2780 | 600 |
|       | 3300 | 262 |

Modifications may be made in carrying out the present invention without departing from the spirit and scope thereof and the invention is to be limited only by the appended claims.

I claim:

1. A compound represented by the formula

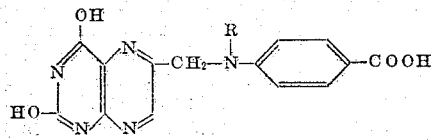

wherein R is selected from the class consisting of hydrogen and formyl substituents.

2. 4 - ([(2,4 - dihydroxy - 6 - pteridyl)methyl]formylamino)benzoic acid.

3. 4-([(2,4 - dihydroxy - 6 - pteridyl)methyl]amino)benzoic acid.

4. The process that comprises reacting a mineral acid solution of 4-([(2-amino-4-hydroxy-6-pteridyl)methyl]formylamino)benzoic acid with nitrous acid, recovering 4-([(2,4-dihydroxy-6-pteridyl)methyl]formylamino)benzoic acid thus formed, hydrolyzing the latter compound and recovering 4-([(2,4-dihydroxy-6-pteridyl)methyl]amino)benzoic acid.

5. The process that comprises reacting a mineral acid solution of 4-([(2-amino-4-hydroxy-6-pteridyl)methyl]formylamino)benzoic acid with a mixture of sodium nitrite and acetic acid, evaporating the mixture to dryness, reacting the residue formed with water to precipitate 4-([(2,4 - dihydroxy - 6 - pteridyl)methyl]formylamino)benzoic acid, recovering said precipitate, reacting the precipitate with hydrochloric acid, diluting said acid mixture with water to precipitate 4 - ([(2,4 - dihydroxy - 6 - pteridyl)methyl]amino)benzoic acid and recovering the latter compound.

6. The process that comprises reacting a mineral acid solution of 4-([(2-amino-4-hydroxy-6-pteridyl)methyl]formylamino)benzoic acid with nitrous acid and recovering 4-([(2,4-dihydroxy-6-pteridyl)methyl]formylamino)benzoic acid.

7. The process that comprises dissolving 4-([(2 - amino - 4 - hydroxy - 6 - pteridyl)methyl]formylamino)benzoic acid in hydrochloric acid, reacting the acid solution thus formed with a mixture of sodium nitrite and acetic acid and recovering 4-([(2,4-dihydroxy-6-pteridyl)methyl]formylamino)benzoic acid.

8. The process that comprises reacting a mineral acid solution of 4-([(2-amino-4-hydroxy-6-pteridyl)methyl]formylamino)benzoic acid with a mixture of sodium nitrite and acetic acid evaporating the mixture to dryness, reacting the residue formed with water to precipitate 4-([(2,4 - dihydroxy - 6 - pteridyl)methyl]formylamino)benzoic acid and recovering the latter compound.

9. The process that comprises hydrolyzing 4-([(2,4 - dihydroxy - 6 - pteridyl)methyl]formylamino)benzoic acid and recovering 4-([(2,4-dihydroxy - 6 - pteridyl)methyl]amino)benzoic acid.

10. The process that comprises reacting 4-([(2,4 - dihydroxy - 6 - pteridyl)methyl]formylamino)benzoic acid with hydrochloric acid, diluting said acid mixture with water to precipitate 4 - ([(2,4 - dihydroxy - 6 - pteridyl)methyl]amino)benzoic acid and recovering the latter compounds.

DONALD E. WOLF.

REFERENCES CITED

The following references are of record in the file of this patent:

UNITED STATES PATENTS

| Number | Name | Date |
|--------|------|------|
| 2,310,167 | Carleson | Feb. 2, 1943 |
| 2,345,215 | Purrmann | Mar. 28, 1944 |
| 2,442,836 | Angier | June 8, 1948 |

OTHER REFERENCES

Science, May 31, 1946, pages 667–669.

Chemical Abstracts, vol. 39, 4684[2,5].

Fieser and Fieser: "Organic Chemistry," page 608.

Fieser and Fieser: "Organic Chemistry," pp. 235–236, 1944 edition, D. C. Heath and Co.